United States Patent
Smith et al.

(10) Patent No.: US 7,143,794 B2
(45) Date of Patent: Dec. 5, 2006

(54) CONSTRUCTION IMPLEMENT FOR GRANULAR BED REGENERATION

(75) Inventors: W. G. Neil Smith, Oakville (CA); D. A. Sandy McKinty, Ancaster (CA); Harold J. Hildebrandt, Collingwood (CA); Mike Girard, Lively (CA); Denis Blais, Chelmsford (CA); Claude Laurin, Azilda (CA)

(73) Assignee: WGNS Investments Inc., Burlington (CA)

( * ) Notice: Subject to any disclaimer, the term of this patent is extended or adjusted under 35 U.S.C. 154(b) by 260 days.

(21) Appl. No.: 10/844,597

(22) Filed: May 13, 2004

(65) Prior Publication Data

US 2005/0172522 A1    Aug. 11, 2005

Related U.S. Application Data

(60) Provisional application No. 60/470,196, filed on May 14, 2003.

(51) Int. Cl.
*B65B 37/00* (2006.01)
(52) U.S. Cl. .................. 141/231; 141/2; 141/65; 141/98; 37/466
(58) Field of Classification Search .......... 141/1, 141/2, 4–7, 65, 98, 231; 37/411, 462, 466; 175/207, 213
See application file for complete search history.

(56) References Cited

U.S. PATENT DOCUMENTS

| | | | |
|---|---|---|---|
| 3,718,367 A | * | 2/1973 | Schumacher ............... 299/14 |
| 3,976,086 A | | 8/1976 | Partin |
| 4,312,762 A | * | 1/1982 | Blackburn et al. .......... 210/768 |
| 5,860,232 A | * | 1/1999 | Nathenson et al. .......... 37/466 |
| 6,722,592 B1 | | 4/2004 | Harris |
| 6,736,171 B1 | | 5/2004 | Harris |

FOREIGN PATENT DOCUMENTS

| | | |
|---|---|---|
| DE | 25 28 483 | 12/1976 |
| EP | 0 305 152 | 3/1989 |
| JP | 62023433 | 1/1987 |
| WO | WO 01/07140 A | 2/2001 |

* cited by examiner

*Primary Examiner*—Timothy L. Maust
(74) *Attorney, Agent, or Firm*—Bereskin & Parr

(57) ABSTRACT

A device for assisting in granular bed reconstruction projects such as catalyst bed construction, includes a frame, a tracked drive, a turret and a boom with an actuator to move the boom relative to the turret. The boom includes a tube for fixing to a vacuum source at one end and an opening for sucking catalyst granules out of the bed on the other end. The device can be operated remotely from a controller. The device is small enough and light weight enough to be able to gain access to the bed and to work on the catalyst without destroying the catalyst. Use of the device eliminates or considerably reduces the need to put persons within the reactor vessel for this stage of reconstruction.

9 Claims, 8 Drawing Sheets

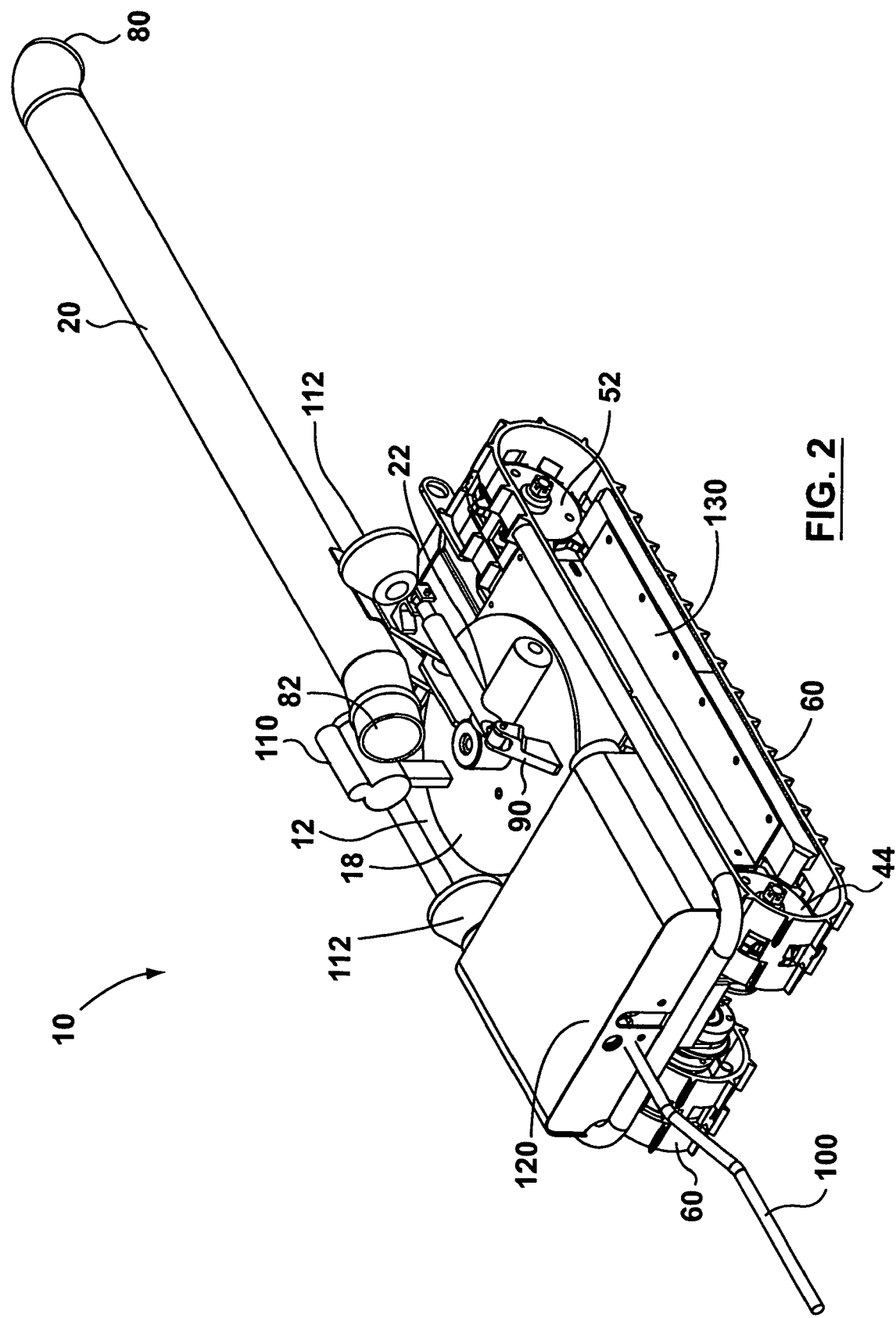

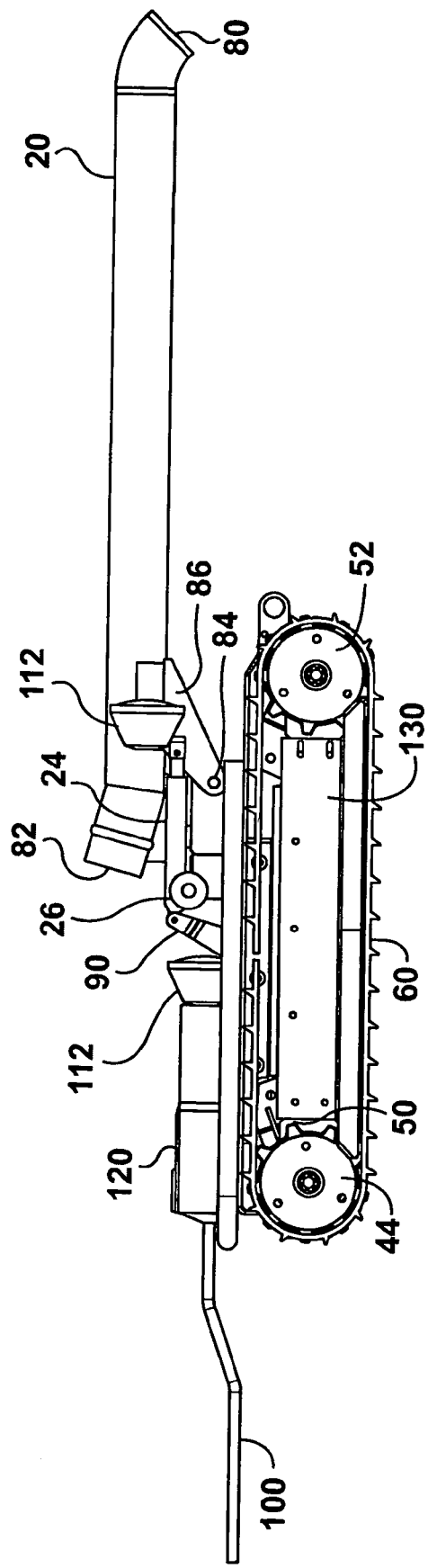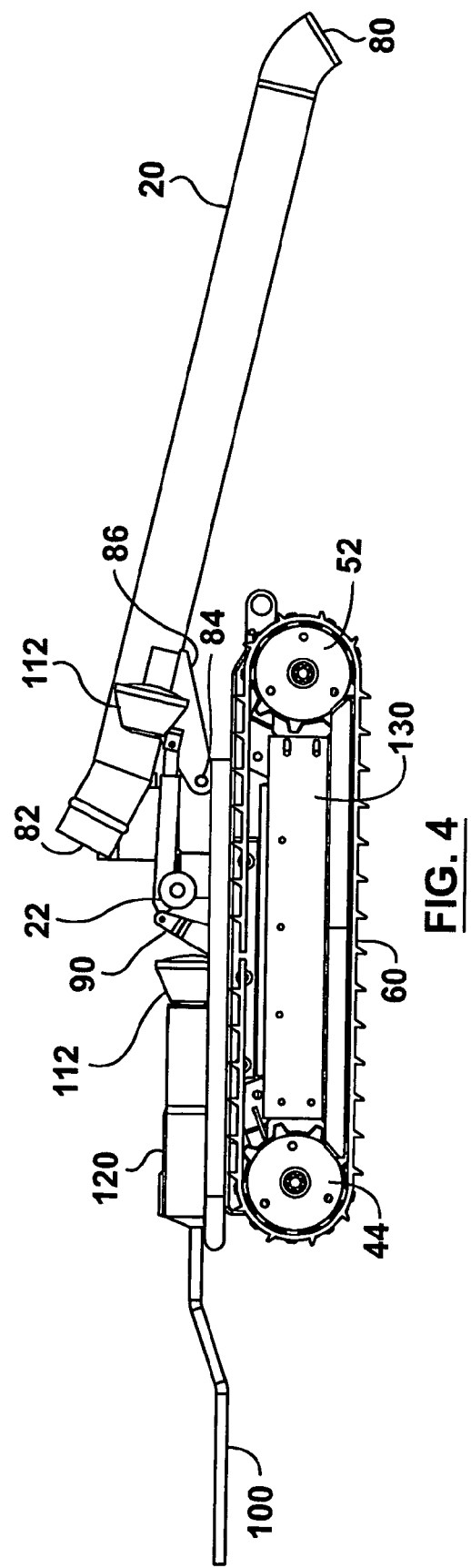

CONSTRUCTION IMPLEMENT FOR GRANULAR BED REGENERATION

CROSS-REFERENCE TO RELATED APPLICATIONS

This application claims benefit from U.S. Provisional Application Ser. No. 60/470,196 filed May 14, 2003 which is incorporated herein by reference in its entirety.

FIELD OF THE INVENTION

This invention relates to a process and apparatus for removing catalyst from a catalyst bed.

BACKGROUND OF THE INVENTION

Catalysts are used in large acid or fertilizer plant vessels to remove products or impurities during the manufacturing process. At a certain point in the life of the catalyst, the catalyst granules have attracted all the materials they can and must be cleaned of these material. In order to clean materials from a catalyst, a process known as screening is required. Screening is the mechanical shaking or vibrating of the catalyst granules to remove the material which may be in the form of dust or chips. After screening, the dust and chips go to disposal and the cleaned regenerated catalyst is returned to the vessel to be reused.

The vessels in which such catalysts are used such as those used in acid plant vessels are relatively large vertically oriented vessels having a diameter of 15 feet or more. The catalyst may be arranged in horizontal layers and a vessel may have several beds and there may be several different layers within the catalyst beds. In order to conduct the screening process, the catalyst is manually removed from the bed within the vessel and remotely screened. The screened catalyst is then replaced within the vessel. These vessels are operated at relatively high temperature, sufficiently hot that an unprotected person cannot enter the vessel immediately following shut down. As the vessels are operated at high temperature, normally, work crews cannot enter the vessel until the vessel has cooled.

In many cases, the vessels have relatively restricted access to the area of the vessel between adjacent beds. Often the access hatch or opening to a vessel may be of the order of 2 to 3 feet square. In unusual cases, the access opening may be as large as 4 feet by 3 feet. The size of such openings will permit a person to pass through the opening but makes it inconvenient to use any type of existing powered equipment within the vessel.

When the vessel is operated at high temperature, the vessel must be allowed to cool to a temperature at which human beings may enter the vessel. If the human beings are protected by a fully enclosing protective suit which is provided with cooling means, the persons may enter the vessel at warmer temperatures. However, once in the vessel, the worker must commence the job of removing the catalyst using hand held tools. This is difficult while wearing such a protective suit and maneuvering through restricted spaces.

In other cases, the vessel is operated at cooler temperatures. However, even when cooler temperatures are used in the process, the restrictions on access remain and the vessel is none-the-less full of gases which are hazardous to health. Thus, even with a vessel operating a cooler process, a person entering the vessel must be in a protective suit and provided with a breathing air supply to protect against the hazardous conditions found within the vessel.

Accordingly, it would be advantageous, if equipment were to be developed which can gain entry into a vessel and work within such a vessel on a catalyst bed to remove the catalyst from the reactor vessel while not damaging the catalyst during removal.

SUMMARY OF THE INVENTION

The present invention provides an apparatus and method for removing catalyst from a catalyst bed. Briefly, the apparatus comprises a frame, the device includes drive means supported on the frame for propelling the frame over a granular catalyst bed. The device has traction means for contacting the bed which are activated by the drive means. The device includes a turret mounted on the frame for relative rotation of the turret relative to the frame. The device includes a boom mounted on the turret for rotation of the turret and an actuator mounted on the turret for adjusting the angle of elevation of the boom relative to the turret.

In accordance with one aspect of the invention, the invention involves a construction implement for use in reconstruction of a granular bed. The construction implement has a frame, drive means supported on the frame for propelling the frame over the granular bed, traction means for contacting the bed and actuated by the drive means, a turret mounted on the frame for rotation relative to the frame, boom means mounted on the turret for rotation about the turret and an actuator which is mounted on the turret for adjusting the angle of elevation of the boom means relative to the turret.

In accordance with a further aspect of the invention, the invention involves a process for removing a crushable catalyst from a granular bed contained within a reaction vessel without the use of human personnel within that reaction vessel. The process involves providing a construction implement as outlined above, connecting the boom means to an industrial vacuum source, placing the implement on the catalyst bed, controlling the implement from a position remote from the bed, maneuvering the implement over the bed and vacuuming the granules from the bed through the boom means.

In accordance with a preferred aspect of the invention, the implement comprises mechanical operators to control the movement of the various parts of the implement without the use of hydraulic fluids or other substances which might be susceptable to combustion at elevated temperatures so that the unit can be used in a catalyst bed which is to be regenerated before the bed has cooled to room temperature. In a particularly preferred embodiment of the invention, the operating structure of the implement is such that the implement can be used at elevated temperatures preferably in excess of 200° F. and more preferably in excess of 300° F.

In accordance with another aspect of the invention, the invention involves a construction implement for use in reconstruction of a granular bed which includes catalyst granules which are susceptible to crushing. The implement includes a frame, drive means supported on the frame for propelling the frame over the granular bed, traction means for contacting the bed and actuated by the drive means, a turret mounted on the frame for rotation relative to the frame, boom means mounted on the turret for rotation about the turret, an actuator mounted on the turret for adjusting the angle of elevation of the boom means relative to the turret, and in which the traction means have sufficient surface area to support the implement on said catalyst bed without crushing said granules.

BRIEF DESCRIPTION OF THE DRAWINGS

FIG. 2 is a view similar to FIG. 1 of the embodiment of FIG. 1 but with a protective cover in place;

FIG. 3 is a side view of the implement shown in FIG. 1;

FIG. 4 is a side view similar to FIG. 3 but showing angular adjustment of one of the components;

DETAILED DESCRIPTION OF THE INVENTION

Figure 1:
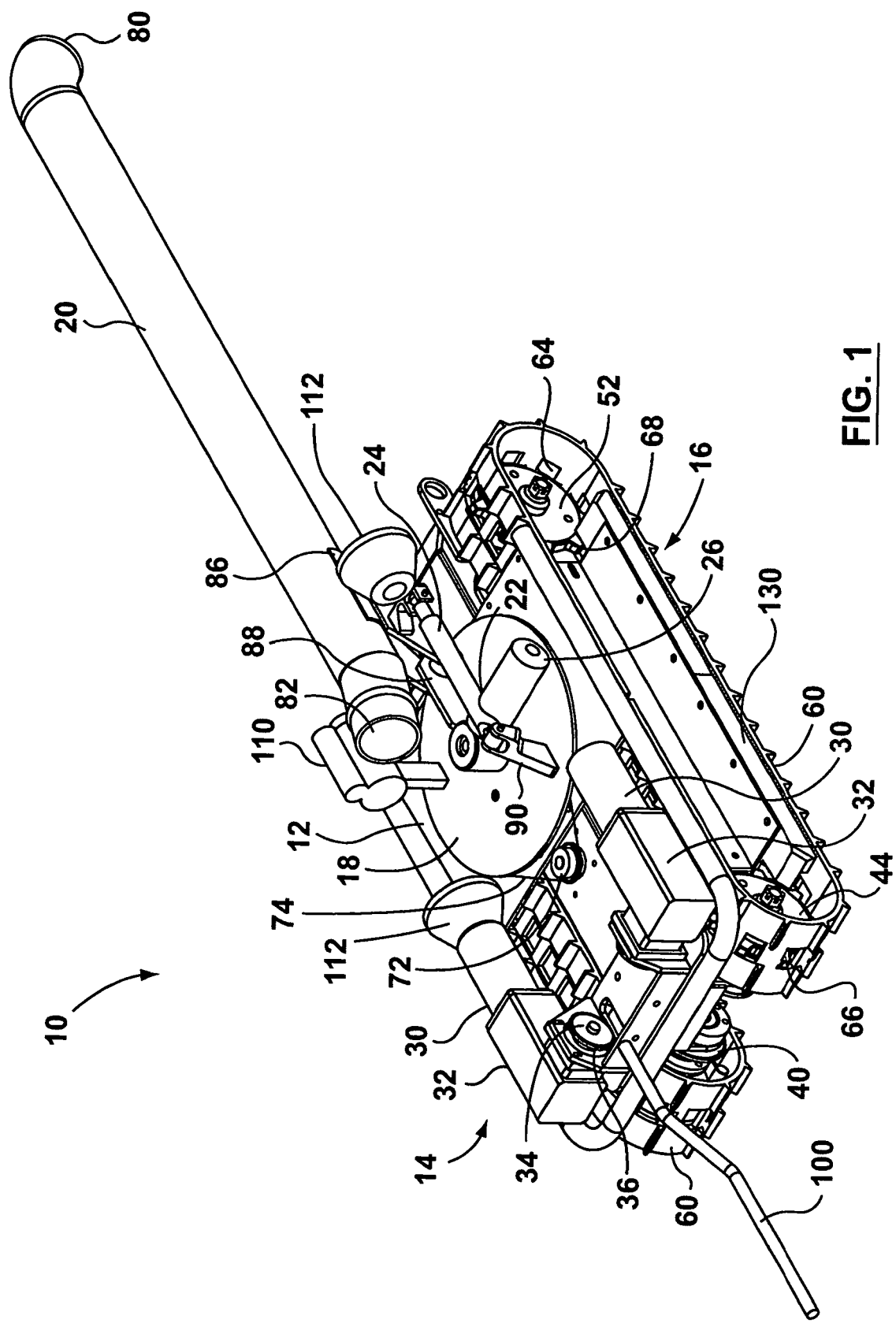
FIG. 1 is a perspective view of a construction implement manufactured in accordance with a first embodiment of this invention.

The device 10 is illustrated in FIG. 1 in a perspective view with a protective cover moved. The device 10 includes a frame 12, a drive means indicated generally at 14, traction means 16, a turret 18, a boom means 20 and an actuator 22.

The drive means 14, include a pair of electric motors 30 and a pair of gear boxes 32. Each gear box has an output shaft on which is positioned a drive sprocket 34, one of which is illustrated in FIG. 1. In each case, the drive sprocket drives a chain 36. The chain in turn drives a driven sprocket 40 attached to a drive shaft 42 (see FIG. 9). The drive shaft 42 transmits power to a drive wheel 44. The drive wheel is mounted on a carrier frame 50. The carrier frame 50 also mounts a forward idler wheel 52 (see FIG. 4). The device 10 is provided with traction means for contacting a granular bed for reconstruction purposes. The traction means 16 includes a pair of tracks 60.

The device 10 is thus supported on the granular bed which is to be reconstructed by the force of the tracks 60 against the bed. The device is kept suitably small for access purposes as discussed more fully below and is also sufficiently lightweight that with the contact area provided by the two tracks 60, there is no damage to the constituent elements of the granular bed as the device propels itself across the bed. The device is powered in the fore and aft direction by use of the two electric motors 30. Conveniently, the electric motors may be fractional horsepower DC motors. A particularly useful motor is a one-sixth horsepower DC motor operating at 90 volts. In order to provide sufficient torque, the gear boxes 32 may include a significant reduction. In a particular embodiment, there is a reduction of 377 to 1 to accommodate the higher revs of the motor referred to above and to provide suitable torque for driving the drive wheels 44 and the tracks 60. Steering is obtained by skid steer. That is, the two motors 30 are independently controllable such as by a joy stick control. The differential speed of the two motors then provides differential movement of the tracks so that the device can be steered. One motor may be operated in reverse while the other is operated forward to provide for turning of the device potentially within its own length. In order to ensure that damage does not occur to the material of the granular bed during such a skid steer, the tracks are of sufficient width and length to provide a sufficiently low contact pressure so that damage does not occur. In order to further support each track 60 on the drive wheel 44 and the idler wheel 52, both drive wheel 44 and idler wheel 52 may be provided with horizontally projecting supports. The supports help to maintain the track 60 in place and help to spread out the weight carried by the drive wheel 44 and idler wheel 52 respectively, over the surface of the track 60. The track 60 may be provided with a series of apertures 64. The apertures 64 are driven by lugs 66 on the driven wheels 44. Similar lugs 68 are provided on the idler wheels 52.

The frame 12 of the device 10 includes a turret 18 which is supported on the frame 12 by a bearing. The bearing is arranged in a direction perpendicular to the general plane of the frame 12 so that the turret may rotate about an axis which is perpendicular to the general plane of the frame 12. In use, this plane of rotation will be substantially parallel to the surface of the granular bed on which the device is working. For controlling the movement of the turret, the device 10 includes a turret motor 70 (see FIG. 9) mounted on the frame 12. The turret motor 70 has an axle which is affixed to a turret drive sprocket 72. The turret drive sprocket 72 drives a chain 74. The chain 74, in turn, is attached to a turret sprocket which is not illustrated, attached to the underside of the turret 72. Operation of the turret motor 70 thus results in rotation of the turret 18 relative to the frame.

The reconstruction device 10 includes a boom means 20. The boom means 20 comprises a hollow tubular member and has an inlet end 80 and an outlet end 82. The boom member 20 creates a vacuum suction path from the inlet end 80 to the outlet end 82. Advantageously, the boom member 20 is sized to meet available vacuum equipment and may have a diameter of four to six inches. The diameter of the boom member, must also be sized to accommodate the materials of the granular bed. In use, the bed materials will be drawn into the inlet end 80, pass along the boom 20 and exit through the outlet end 82. In use, the outlet end 82 is attached to a vacuum line. The vacuum line is not illustrated in the drawings. The vacuum line will be attached to a commercial vacuum source such as a large horse power vacuum truck which may be parked adjacent to the facility containing the granular bed to be reconstructed.

The length of the boom member 20 is selected so that the inlet end 80 may be lowered at least as low as the bottom plane of the tracks 60 so that the granular material of the bed may be drawn into the inlet end 80. In order to move the boom means 20 from a lowered position in which it may engage the granular material of the bed to an upper position for transport or for working at a higher level, the boom means is supported on a boom support member 86. The boom support member 86 may be a U-shaped bracket or a pair of brackets. In either case, the boom support member 86 is pinned at pin 84 to a plate 88 which is fixed to the turret 18. The pin 84 provides a pivotal axis which is parallel to the plane of the turret 18. In order to pivot the boom member 20 about the pivotal axis of the pin 84, the device 10 is provided with the actuator 22. The actuator 22 includes a ram 24 which is driven by an electric motor 26. The ram 24 is pinned to the boom support member 86 at one end and to a turret bracket 90 mounted on the turret 18. Operation of the motor 26 causes extension of the ram 24 thereby pivoting the boom support member 86 and the boom means 20 about the pin 84.

Figure 5:
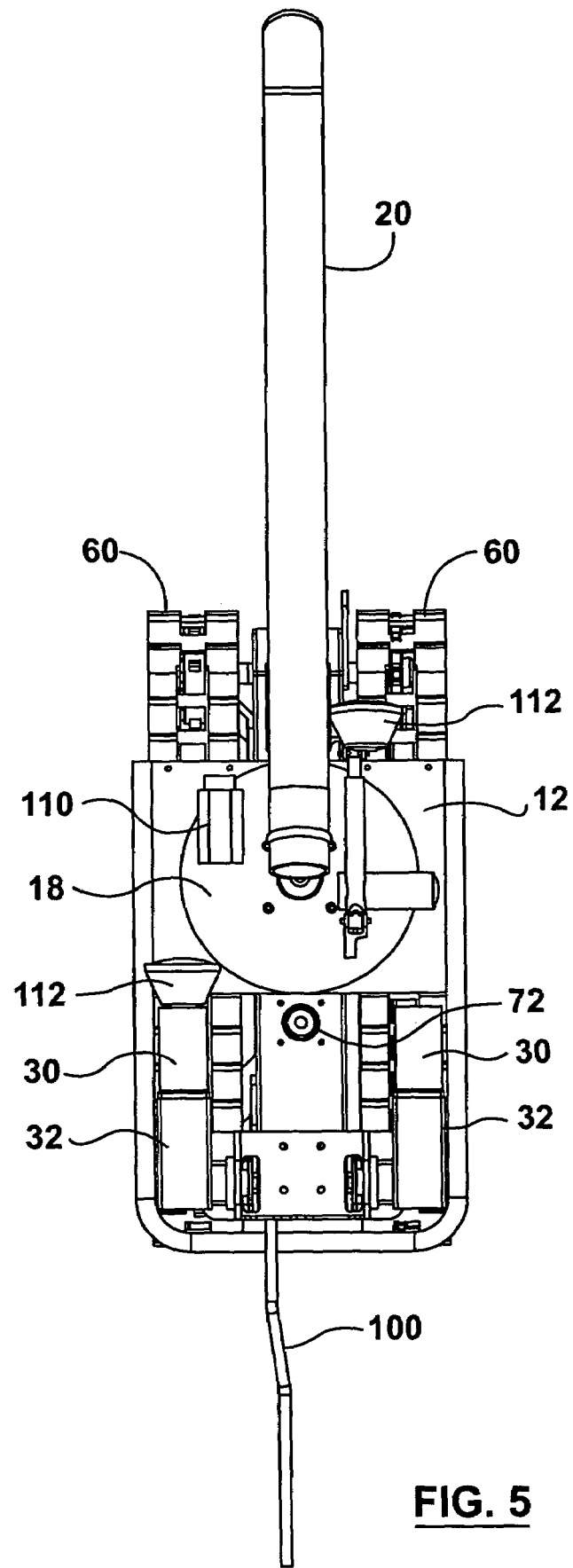
FIG. 5 is a top view of the implement shown in FIG. 1.
Figure 6:
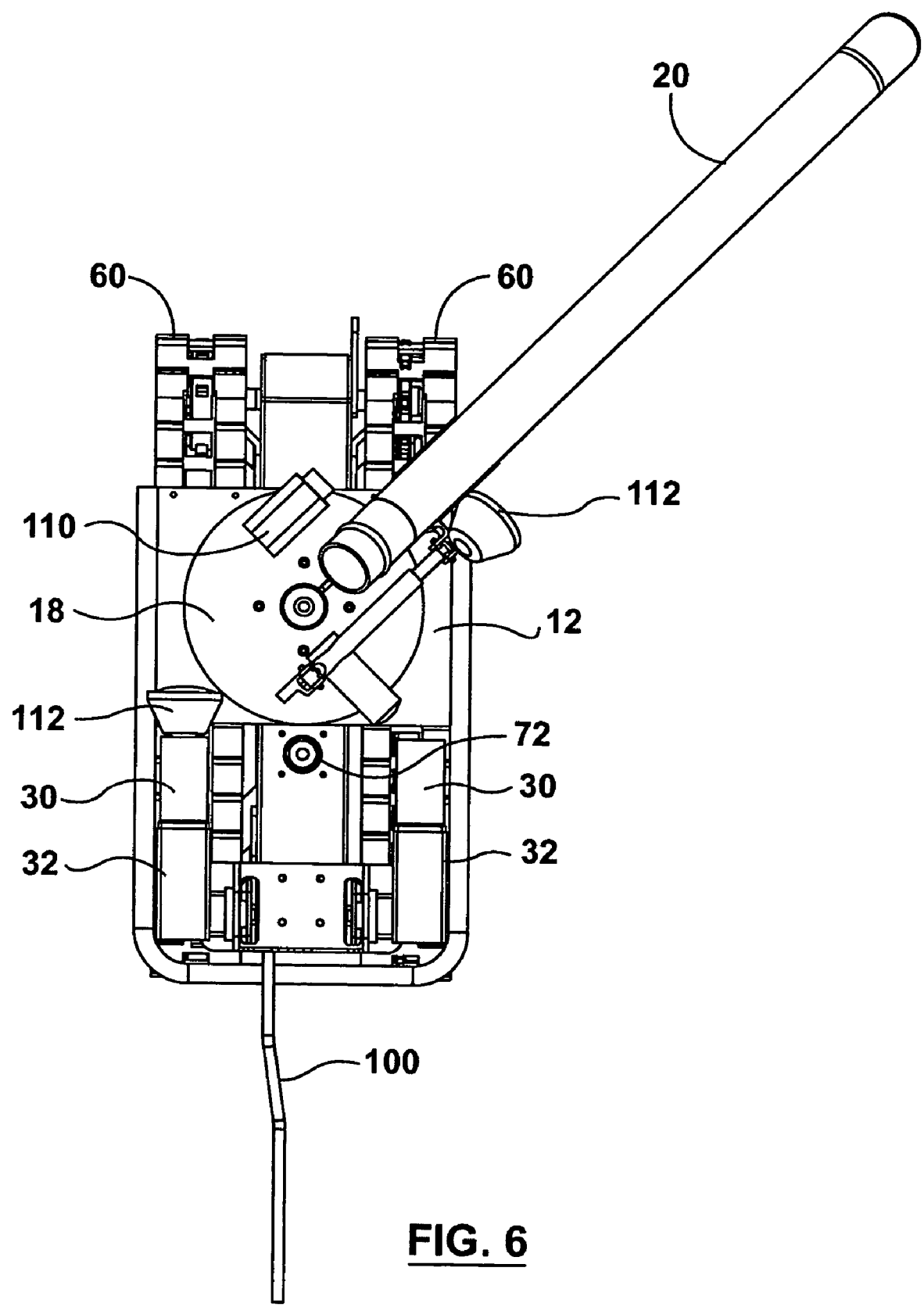
FIG. 6 is a top view similar to FIG. 5 but showing an angular adjustment of one of the components.
Figure 7:
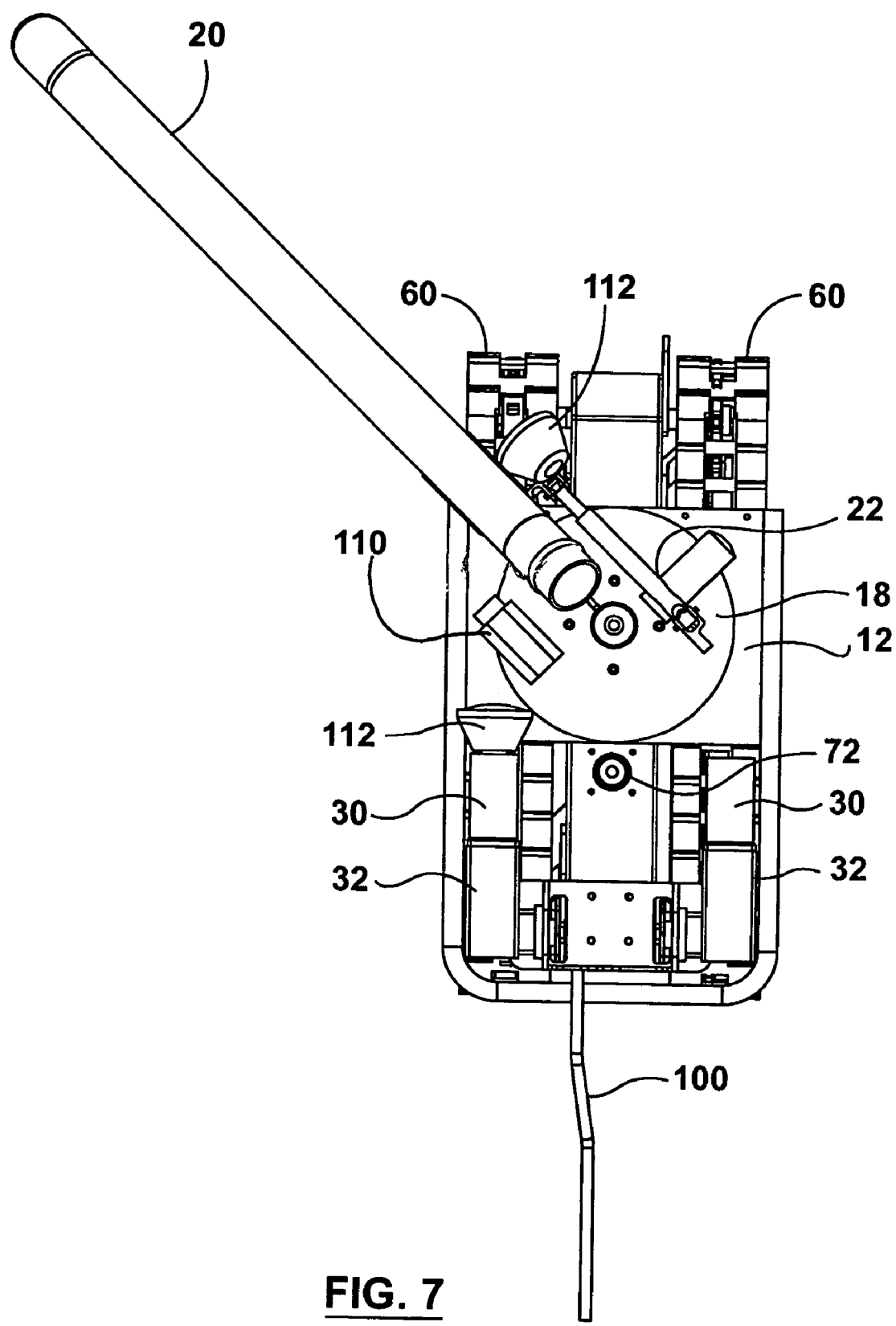
FIG. 7 is a view similar to FIG. 6 but showing adjustment in an opposite direction.
Figure 8:
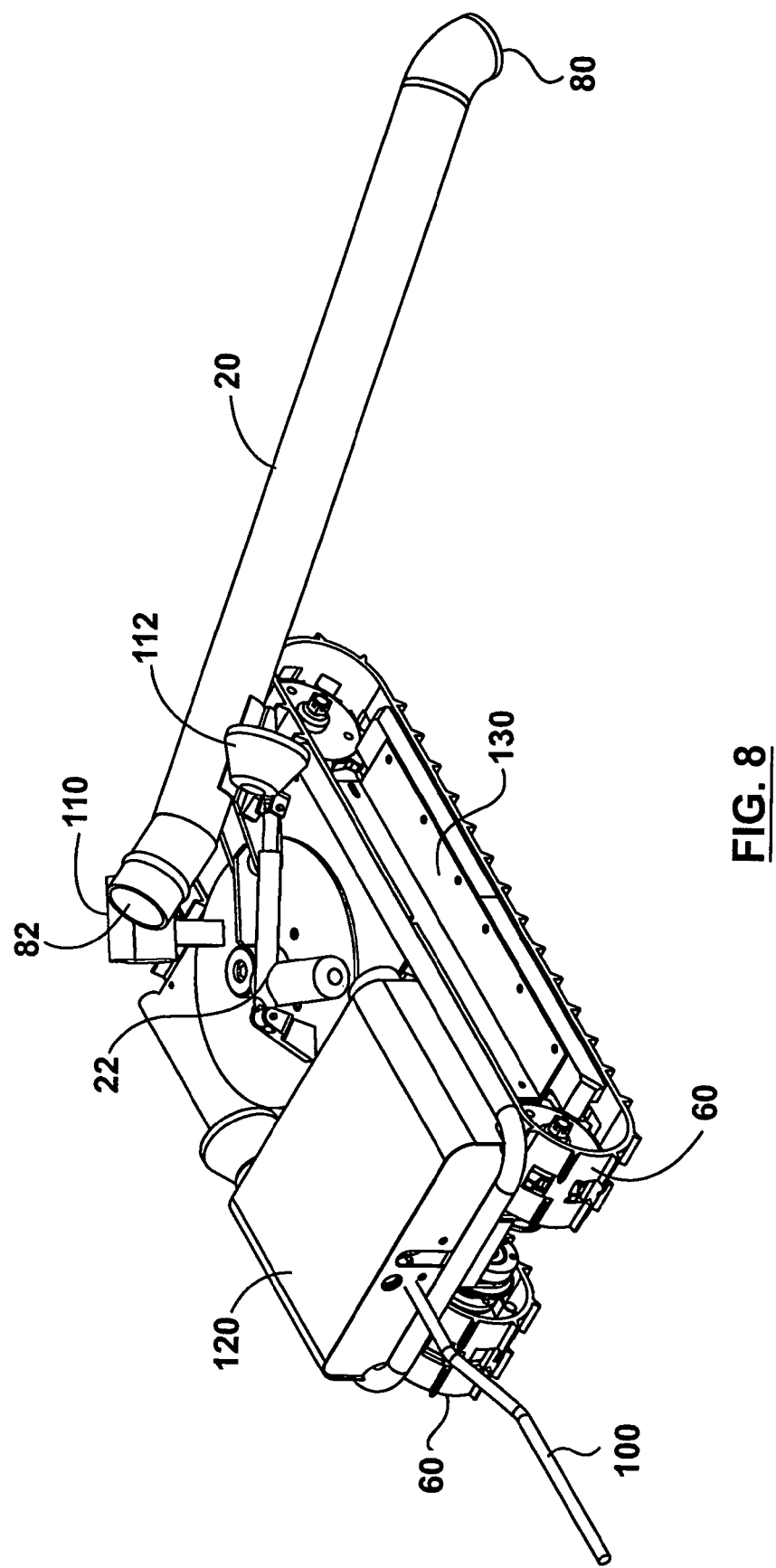
FIG. 8 is a perspective view similar to FIG. 2 but with one of the components shown angularly adjusted in both the horizontal and vertical planes.

As shown in FIG. 5, the boom means 20 is oriented in a forwardly direction during initial transport onto the granular bed from an access opening. As shown in the overhead views of FIGS. 6 and 7, by operation of the turret motor 70, the boom means 20 can be moved to extend either right or left of the position shown in FIG. 5. The amount of rotation may be selected so that the boom has a working sector as broadly as desired. The sector may be as large as 180°. As shown in FIG. 8, when the boom has been rotated in the plane of the turret to the desired angle, the boom may then be raised or lowered using the actuator 22 to bring the inlet aperture 80 of the boom 20 into contact with the material to be drawn into the boom means 20.

Typically, the device may be used in relatively confined areas such as in the catalyst beds of acid plants. Acid plants are relatively large facilities which are used to reduce sulphur emissions from exhaust gases of large metallurgical refining industries. The exhaust gas is passed through the acid bed to help remove certain constituents from the gas. The removal process in part is a chemical reaction taking place involving catalysts set out in beds within the device. A typical catalyst is vanadium oxide. The catalyst is in the form of a pellet or ring which may be of the order of about 1 inch in diameter. Often such beds have under layers which contact the support structure for the bed and may have an over layer over the active catalyst and these may be in the form of rocks or lumps of about 1 to 2 inches in diameter. All such beds may be as large as 40 or 50 feet in diameter or more, and there is usually relatively limited access to the bed. When the bed is operating, because it is dealing with flue gases from a metallurgical process, the bed may be operated at very high temperatures in the order of 400°, 500° or 600° C. When the bed requires regeneration, the catalyst is removed from the bed and passed through a screening process. The cleaned catalyst is then reinstalled in the bed and used again. In order to withdraw the catalyst from the bed and subject it to the screening process, the catalyst is withdrawn from the bed. This is accomplished by vacuuming the catalyst into the boom means and passing the catalyst along a suction hose, through a suitable vacuum, to capture the catalyst, which may then be screened.

The device 10 is used when the temperature within the bed has dropped to a level to permit use of the machine. For various metallurgical and other reasons, it is generally unacceptable to use any type of combustion motor which would emit exhaust fumes, or to introduce any kind of fuel into such a reactor, which may still be quite hot, during use of this device. Similarly, in order to provide higher temperature operation, it is typically unacceptable to the owners and operators of such catalyst bed facilities to introduce hydraulic fluid into the bed. Thus, the preferred power means is electrical motors. While the preferred power means involves use of electrical motors, some or all of the devices may involve pneumatic equipment. By way of particular example, the ram 24 may be a pneumatic ram if desired. In such a case the implement is provided with a source of compressed air to actuate such components.

As electrical motors are used for drive control of the vehicle as well as for adjustment of the angular relation of the components discussed above, it would be possible to provide on-board battery power for the vehicle. However, in order not to introduce batteries into a high temperature atmosphere, and to minimize the weight of the vehicle, the preferred source of power to the vehicle is an umbilical chord 100 (see FIG. 1). The umbilical chord 100 thus provides appropriate current to power each of the motors discussed above. In addition, the umbilical chord includes a control cable for controlling the operation of the motors. All of the motors may be controlled by suitable control means such as joy sticks and the like, so that the device can be operated remotely.

Further, to facilitate remote operation of the device 10, the device 10 includes camera means 110. The camera means 110 are oriented to view the desired work sector in front of the device so that the operator can control the location of the device and the location of the boom means 20 to draw catalyst into the inlet end 80. Further, to facilitate vision, the device 10 includes illumination means 112. The illumination means can include one or more high temperature lights arranged to suitably light the work sector.

In FIG. 1, the device is shown without a cover over various components mounted on the frame 12. As shown in FIG. 2, the drive motors, the gear boxes and drive sprockets 34 are all enclosed within a protective cover 120. As the device moves about a bed of granular material, it is possible that some of the constituent elements of the granular bed may become deposited on the inner or driven surface of the track 60. Therefore, preferably, the track 60 may include one or more deflection means 130 for reducing the likelihood of granular material being deposited on the inside surface of the track.

Figure 9:
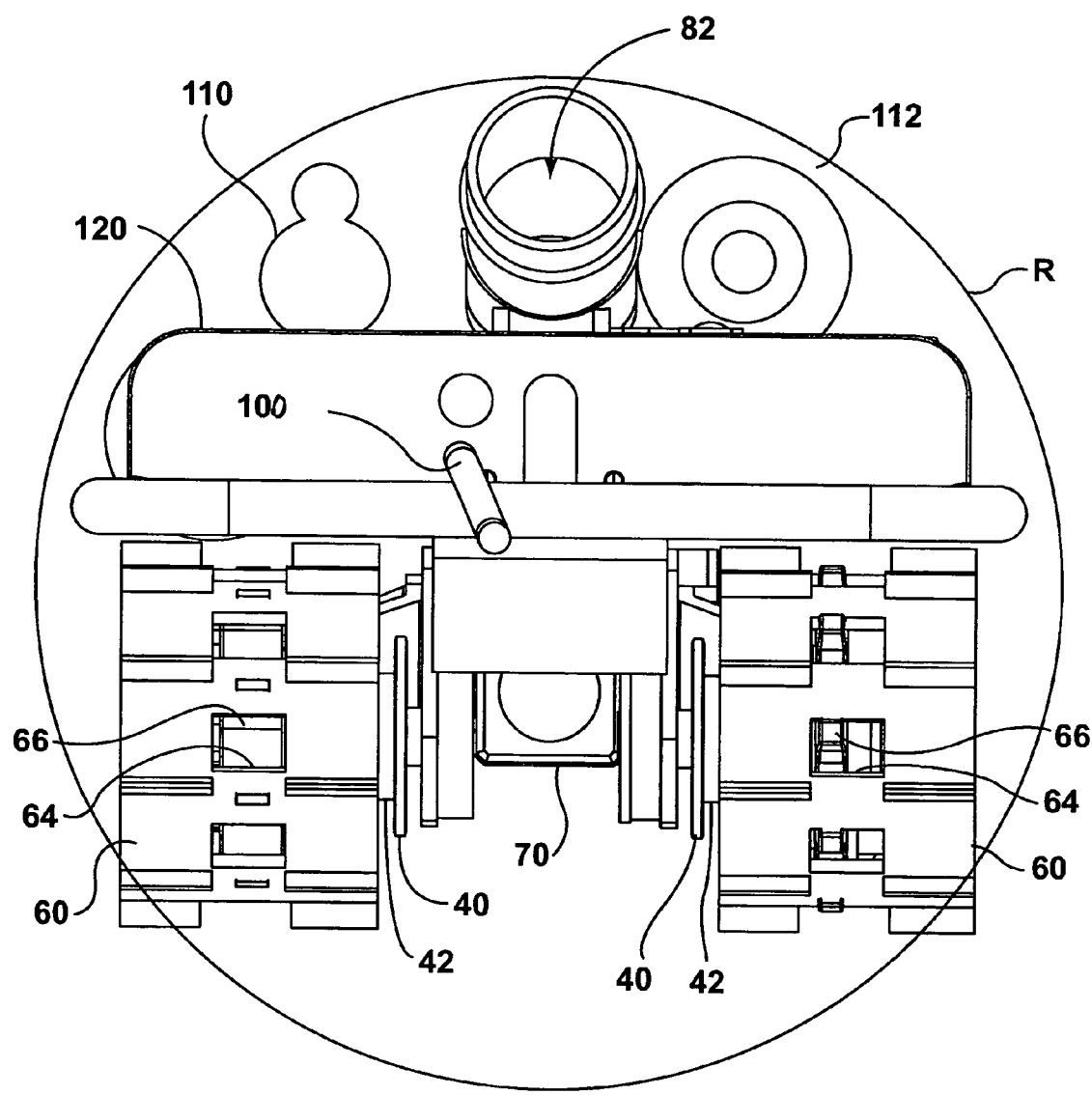
FIG. 9 is a rear view of the implement shown in FIG. 2.

Many large metallurgical refining processes create a significant amount of dust. In many such facilities there are large vehicle mounted industrial vacuum cleaners. The preferred mode of operation of the present device is to station such a vacuum truck as close as conveniently possible to an access hole or door to a granular bed to be regenerated. A hose is directed from the vacuum truck to the outlet end 82. After shut down of the facility, and when the facility reaches a temperature suitable for operation of the device 10, the device 10 is passed through an access door. Many such access doors are not larger than two feet, although some may be as large as four feet by six feet. In FIG. 9, the circle "R" is a circle showing a scale diameter of 24 inches. As shown, the device 10 represented at the same scale fits substantially within the circle "R" illustrating that the device may be passed through the rectangular opening having dimensions 2 feet by 2 feet, or larger. The operator will then stand adjacent the access hole. The operator will hold the control console for the machine and direct the machine as it enters into the bed and begins the catalyst removal process. Because of the heat and hazardous nature of the material, the operator will, in most circumstances, be required to be in a protective suit and to have breathing oxygen supplied. However, the operator can remain outside the tank and can operate the device by a combination of view through the access opening as well as monitoring the camera picture which would be reproduced on the console. Catalyst removal can then be accomplished by vacuuming up the catalyst and/or its protective or supporting layers as desired.

Thus, in accordance with this device, there is provided a device which is capable of operating in a relatively confined area while having sufficient support area to not damage the catalyst upon which it is working. The catalyst is withdrawn through the boom means. Because the device can work at higher temperatures than a worker without the need of a cooling suit and can operate in confined spaces, the device effectively reduces or may totally eliminate the need for any worker entrance into the vessel during the removal phase of the bed reconstruction process.

While the device as discussed herein has been discussed primarily in connection with the removal of catalyst from a catalyst bed, the device is also useful in other catalyst bed operations. From time to time, maintenance is required of such catalyst beds. That maintenance may involve certain attention to the bed while not necessitating catalyst removal from the bed. Thus, there are circumstances in which the maintenance may involve raking the bed. The device as described herein is particularly suited for carrying out such a raking operation. When used in a raking operation, a suitable device having tines may be fitted to the inlet end 80 of the device. Then by using the various motors on the device, the bed may be raked so as to perform this interim bed maintenance program. Ordinarily such interim maintenance programs on the bed would be performed while the bed is at an elevated temperature. If the raking of the bed were to be performed by humans, then the bed operator is faced either with the prospect of waiting until the bed has cooled to permit ordinary human work inside the bed, or alternatively, the workers must be fitted with particularly expensive and cumbersome high temperature operating suits. The construction implement as explained herein may be utilized when the bed has cooled to such temperatures as will not be harmful to the construction implement but which may be well above the temperatures that could be tolerated by humans without such extensive protection. Again, because of the remote operating capabilities of the machine, such interim maintenance would be carried out by an operator from the remote operating console using the camera and lighting equipment mounted on the device and/or such other visual opportunities as may be available through the access portal.

Another use of the construction implement described herein involves the reconstruction of the bed after the catalyst has been regenerated. Typically, at the stage of reconstruction of the bed, the facility containing the catalyst bed may well have cooled to a relatively cool temperature approaching that of room temperature. However, rather than necessitating worker entrance into the area containing the bed and possible damage to the bed, the device in accordance with the present invention may also be used to reload the granular material into the bed. Because the granular material is relatively susceptible to damage, the material has to be reloaded relatively slowly. This can be usefully accomplished by using the boom now as a delivery conduit rather than as a suction conduit. In such circumstances, a hose capable of delivering catalyst and like granules under slight pressure may be connected to the outlet end 82 of the conduit. The catalyst may then be supplied to the boom 20 and will exit the boom at the inlet end 80 described above. By manipulating the construction implement, the catalyst may be laid down in the bed over the full extent of the bed. If additional raking is then required to reconstitute the bed, an implement may be attached to the inlet end 80 as explained above in connection with interim maintenance to help reconstitute the bed after catalyst regeneration.

Thus, it will be seen that the device discussed above has many utilitarian functions. The device is supported on tracks which have a sufficiently broad support area that the device may move about the bed without damaging the granules. Additionally, as the device may be constructed of materials which are capable of use under conditions which would otherwise be unfit for human habitation, it can be used at elevated temperatures thereby providing access to a commercial facility before cool down to room temperature has been completed. This helps speed up the beginning of catalyst regeneration thereby helping to minimize down time that would otherwise be required if the facility were to be cooled to room temperature before catalyst bed regeneration were to be commenced.

Various other modifications and changes may be made to the construction implement described herein. All such amendments and modifications are to be considered within the scope of the current invention which is defined in the following claims.

The invention claimed is:

1. A construction implement for use in reconstruction of a granular bed, said implement comprising;
   a frame;
   at least one motor supported on said frame for propelling said frame over a granular bed;
   two traction tracks for contacting said bed and actuated by said at least one motor;
   a turret, mounted on said frame for rotation relative to said frame;
   a boom mounted on said turret;
   an actuator, mounted on said turret for adjusting the angle of elevation of said boom relative to said turret;
   and wherein said boom comprises a hollow conduit having a first and second end;
   and wherein said boom comprises a suction inlet at said first end and an attachment at said second end for attaching said second end to a source of vacuum pressure;
   and wherein the at least two tracks have sufficient surface area to support said implement on said catalyst bed without crushing said catalyst.

2. The implement of claim 1 wherein the implement includes steering means.

3. The implement of claim 2 wherein said steering means includes separate drive means for each track so that said implement may be skid steered.

4. The implement of claim 3 wherein said implement includes turret rotation means for rotating said turret relative to said frame.

5. The implement of claim 4 wherein said implement includes illumination means for lighting said bed.

6. The implement of claim 5 wherein said implement includes remote control means for operating said at least one motor, said steering means, said turret rotation means and said actuator.

7. The implement of claim 6 wherein said implement includes at least one camera.

8. The implement of claim 6 wherein said implement includes an umbilical cord extending from said frame to said remote control means.

9. A process for removing a crushable catalyst from a granular bed contained within a reaction vessel without the use of human personnel within said reaction vessel comprising;
   providing a construction implement comprising a frame;
   at least one motor supported on said frame for propelling said frame over a granular;
   two traction tracks for contacting said bed and actuated by said at least one motor;
   a turret, mounted on said frame for rotation relative to said frame;
   a boom mounted on said turret;
   an actuator, mounted on said turret for adjusting the angle of elevation of said boom relative to said turret,
   connecting said boom to an industrial vacuum source,
   placing said implement on said bed,
   controlling said implement from a position remote from said bed,
   maneuvering said implement over said bed, and
   vacuuming said granules from said bed through said boom.

* * * * *